United States Patent
Grubb

(10) Patent No.: US 6,315,220 B1
(45) Date of Patent: Nov. 13, 2001

(54) METHOD AND APPARATUS FOR CONVERTING A FAUCET TO A HAND-HELD SHOWER

(76) Inventor: Tonya L. Grubb, 1720 E. Tulsa St., Gilbert, AZ (US) 85296

( * ) Notice: Subject to any disclaimer, the term of this patent is extended or adjusted under 35 U.S.C. 154(b) by 0 days.

(21) Appl. No.: 09/360,535

(22) Filed: Jul. 26, 1999

(51) Int. Cl.⁷ .................................................. B05B 15/06
(52) U.S. Cl. .............................................. 239/588; 4/615
(58) Field of Search ................................. 239/588, 587.1; 4/467, 615

(56) References Cited

U.S. PATENT DOCUMENTS

| | | | |
|---|---|---|---|
| 785,824 | * | 3/1905 | Nicholls . |
| 1,319,738 | * | 10/1919 | Watrous ........................... 239/588 X |
| 1,327,428 | * | 1/1920 | Gregory ........................... 239/588 X |
| 1,432,501 | * | 10/1922 | Tuozzuli ........................... 239/588 X |
| 1,641,778 | * | 9/1927 | Overton . |
| 1,840,812 | * | 1/1932 | Hardy . |
| 2,218,759 | * | 10/1940 | Lineman ............................... 239/588 |
| 2,383,235 | * | 8/1945 | Brown .............................. 239/588 X |
| 2,600,554 | * | 6/1952 | Lyons .............................. 239/588 X |
| 2,873,999 | * | 2/1959 | Webb ................................... 239/588 |
| 3,865,310 | * | 2/1975 | Elkins et al. ..................... 239/588 X |
| 4,413,362 | * | 11/1983 | Chianco et al. ..................... 4/615 X |
| 5,070,553 | * | 12/1991 | Chambers ........................... 4/615 X |
| 5,926,868 | * | 7/1999 | Bjerke ................................. 4/615 X |

* cited by examiner

*Primary Examiner*—Lesley D. Morris
(74) *Attorney, Agent, or Firm*—Snell & Wilmer, L.L.P.

(57) ABSTRACT

A method and apparatus for converting a faucet or existing shower head into a flexible and extendable shower apparatus which includes an adaptable connector having one end for receiving a faucet or existing shower head, a flexible and extendable hose connected to an opposite end of the adaptable connector, and a shower head connected to the extendable hose opposite the adaptable connector. The apparatus also includes clamping means for releasable securing the adaptable connector around a faucet or existing shower head. Further, the adaptable connector and flexible, extendable hose may comprise one continuous piece.

18 Claims, 5 Drawing Sheets

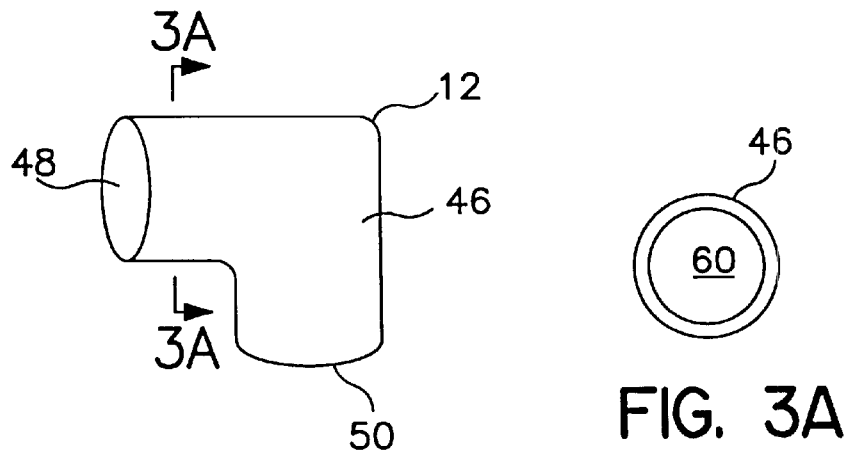
FIG. 3
FIG. 3A
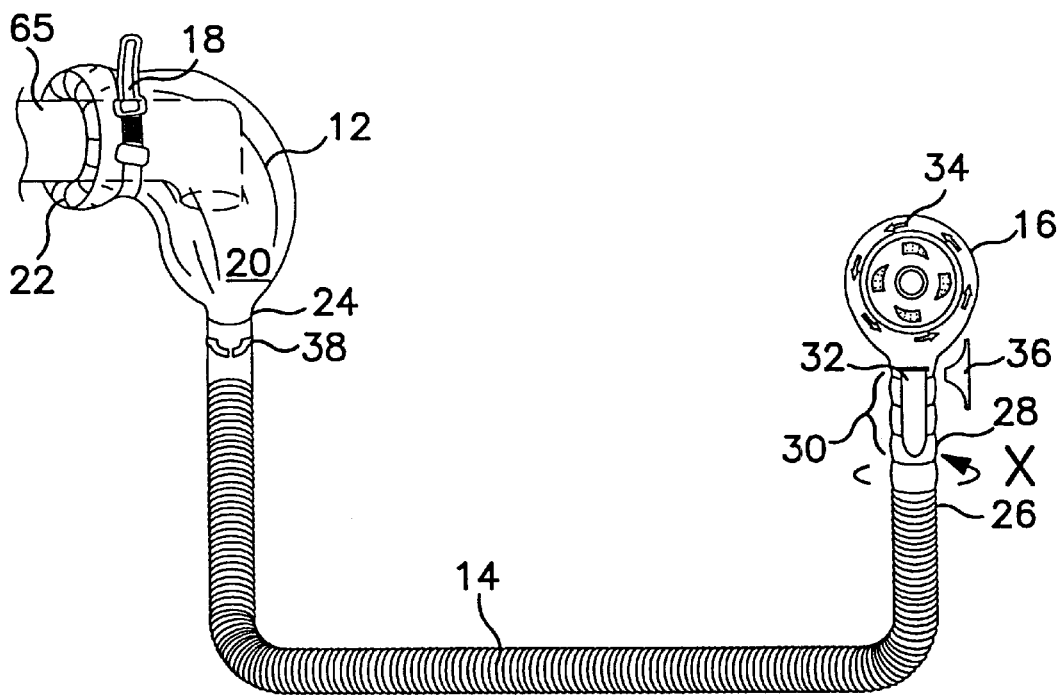
FIG. 4

METHOD AND APPARATUS FOR CONVERTING A FAUCET TO A HAND-HELD SHOWER

TECHNICAL FIELD

The present invention relates, generally, to a method and apparatus for converting a faucet to a hand-held shower device. More particularly, the present invention is directed to a method and apparatus for converting a faucet to a hand-held shower device which includes an adaptable connector that can be adapted to fit any size or type of faucet including a bath faucet, a sink faucet, an outdoor faucet, and an existing shower head faucet.

BACKGROUND OF THE INVENTION

The number of bathrooms existing in American households has increased. Of the privately owned single-family houses completed in 1995, only 11% had just 1½ bathrooms or less, compared to 13% of the homes built in 1990 and 27% of those built in 1980. Of the homes completed in 1995, 41% had two bathrooms, and another 48% had more than two bathrooms.

In addition to the increased number of bathrooms now being built in American households, there is also a clear trend in constructing bathrooms that are more luxurious. For example, today's master bathrooms typically include a whirlpool bath that is separate and apart from an enclosed shower. It is not uncommon for Americans to have saunas, whirlpool baths, exercise equipment and other luxuries in their bathrooms. As a result, it has sometimes become more difficult to bathe for physically challenged or elder individuals who may have difficulty moving in a shower stall. A solution to this problem exists in converting a faucet or existing shower head into a flexible and extendable shower head.

Several devices for converting a faucet into a movable and extendable shower head exists in the prior art. For example, U.S. Pat. No. 1,279,006, issued to Rose, discloses a device that can be readily applied to or detached from a standard bathtub fixture which affords a full and effective shower. The device includes a flexible tube adapted to connect to a bathtub faucet on one end and a shower head on the other. Straps are placed around both ends of the flexible hose and secured to the faucet and shower head, respectively, by screws and thumb nuts. A rigid arm separates the bands and functions to mount the shower head in different positions. The bands, straps, and all other parts, except for the flexible tube, are made of sheet metal.

U.S. Pat. No. 5,014,919, issued to Knapp, describes a hand-held shower head for domestic sinks having a tubular handle member connected to the water supply via flexible piping. Although this patent does not describe means for connecting the flexible pipe to a water supply, this patent reference does disclose a hand-held shower head that can be used with a faucet and residential sink that is adapted for low supply water pressure and particularly for a water supply through a simplified diverter valve.

Further, U.S. Pat. No. 4,413,362, issued to Chianco et al., discloses a sit-down shower for children which includes a sleeve adaptor that fits over a bathtub's tap and a rigid and self-supporting tubing extending from the adapter which projects the shower water to a movable shower head that is connected to the far end of the rigid tubing. The rigid tube forms a one-piece plastic molded unit with the adaptor and the adaptor may be clamped on the faucet with a conventional clamp.

Although the general concept of converting a faucet into an extendable and movable shower head does exist as evidenced by the above described patents, there is a need for an apparatus for converting a faucet or existing shower head to a hand-held shower head which can accommodate any type or size of faucet and which can be easily secured to, and removed from, the faucet. In addition, there is a need for a simple and low-cost device which converts any type or size of faucet or existing shower head into a hand-held shower without leaking. Such a device should be able to be easily manipulated by children, physically handicapped individuals, and the elderly.

BRIEF SUMMARY OF THE INVENTION

The principal object of the present invention is to provide a method and apparatus for converting any size or type of faucet or existing shower head into a movable and extendable shower head that allows the user to direct the stream of water from the shower head in any direction.

It is another object of the present invention to provide a method and apparatus for converting any type or size of faucet or existing shower head into a movable and extendable shower head apparatus that is flexible, durable, versatile, and easy to install and remove.

It is still another object of the present invention to provide a method and apparatus for converting any type or size of faucet or existing shower head into a movable and extendable shower head that is convenient, effective, and easy to manufacture.

It is yet another object of the present invention to provide a method and apparatus for converting any type or size of faucet or existing shower head existing in hotels, motels, fitness clubs, hospitals, rehabilitation centers, nursing homes, standard homes, etc., into a movable and extendable shower head device that can be easily used to shower individuals, wash family pets, and clean and sanitize existing bathtubs and shower stalls.

The above and other aspects of the present invention may be carried out in one exemplary form of the invention by an adaptable connector having a flexible opening for receiving a faucet, an extendable hose having a first end connected to the adaptable connector and a second end connected to a shower head, and means for releasably securing the flexible opening of the adaptable connector about the opening of a faucet.

In another aspect of the present invention, the adaptable connector may comprise a hollow, flexible connector element that is generally bulb shaped or spherical in shape. This generally bulb shaped or spherical shaped configuration of the adaptable connector enables the method and apparatus for converting a faucet or existing shower head to a flexible and extendable shower apparatus to operate under high water pressure conditions without becoming forcibly removed from the faucet. In another aspect of the present invention, the adaptable connector and extendable hose may be formed from one continuous piece of material, such as a flexible rubber, polyethylene or any other flexible polymers consisting of lightweight thermoplastics that are resistant to chemicals and moisture and have good insulating properties. In still another aspect of the present invention, the shower head connected to the faucet or existing shower head by way of the extendable hose may rotate about a circumference of the extendable hose thereby avoiding twisting and tangling of the extendable hose during use. Alternatively, if the adaptable connector and extendable hose are not formed from one continuous piece, the extendable hose may also be configured to rotate about a circumference of the adaptable connector at its connection point with the adaptable connector by using currently existing hardware.

One exemplary method of the present invention for converting a faucet or existing shower head into a flexible and extendable shower apparatus comprises the steps of attaching an adaptable connector having a flexible opening around a faucet opening or existing shower head, releasably securing the adaptable connector to the faucet or existing shower head with a clamping means, and employing a switching means on a shower head connected to the adaptable connector by way of an extendable hose to access water flow through the shower head.

BRIEF DESCRIPTION OF THE DRAWINGS

A more complete understanding of the present invention may be derived by referring to the detailed description and claims when considered in connection with the following illustrative figures, which may not be to scale in the following figures, like reference numbers refer to similar elements throughout the figures.

FIG. 3 is a perspective view of another exemplary embodiment of the adaptable connector included in the apparatus of the present invention for converting any type or size of faucet or existing showerhead into a flexible and extendable shower apparatus;

FIG. 3a is a cross-sectional view taken along line 3a—3a of FIG. 3; and

FIG. 4 is a perspective view of the exemplary embodiment of the apparatus of the present invention for converting any type or size of faucet or existing showerhead into a flexible and extendable shower apparatus illustrated in FIG. 1 shown connected to a bathtub faucet.

DETAILED DESCRIPTION OF EXEMPLARY EMBODIMENTS

The subject invention relates to a method and apparatus for converting any type or size of faucet or existing showerhead into a flexible and extendable shower apparatus that allows a user to direct a stream of water in any direction and at any angle in order to allow a user to thoroughly cleanse the person, animal or object being washed or cleaned.

Figure 1:
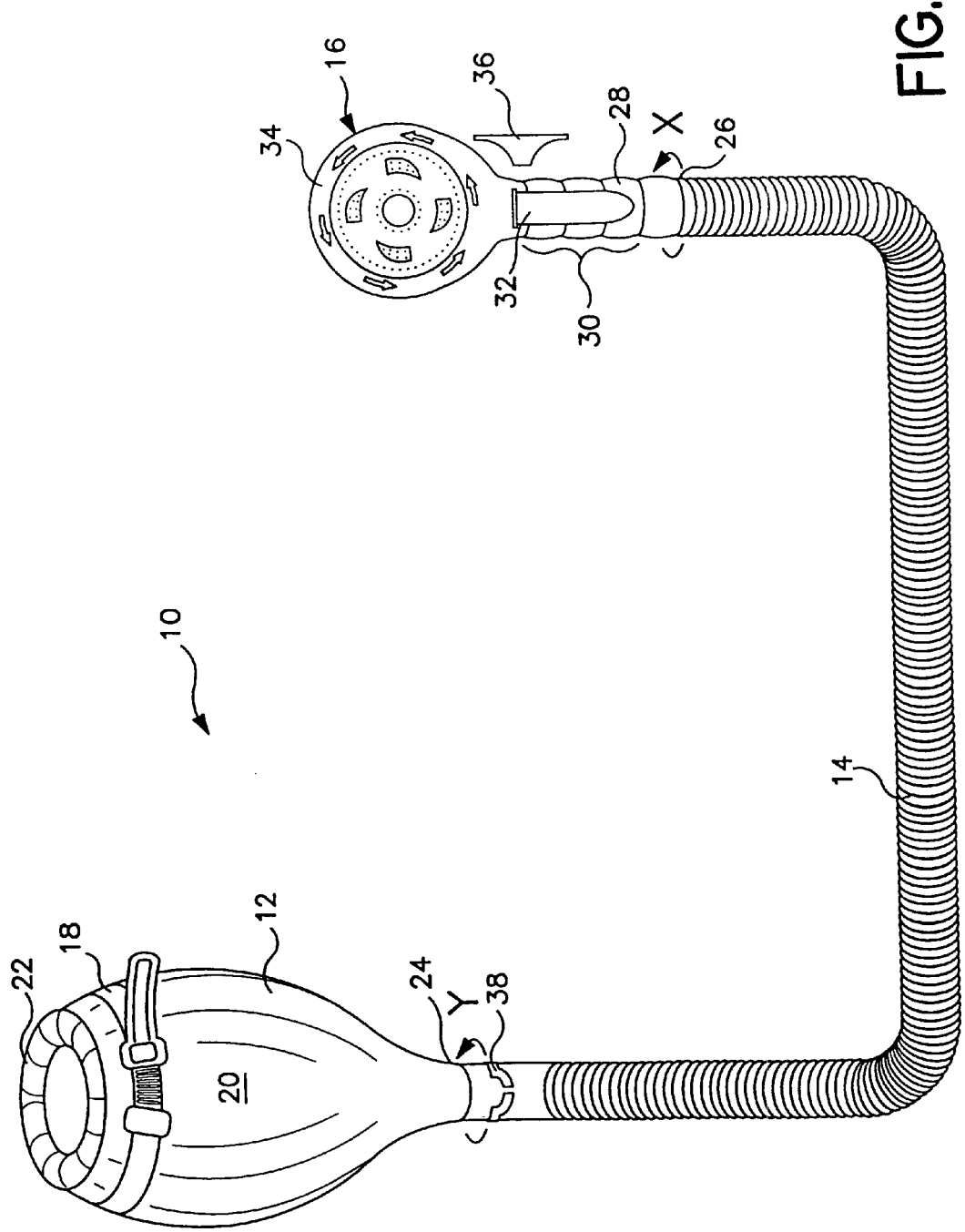
FIG. 1 is a perspective view of one exemplary embodiment of the apparatus of the present invention for converting any type or size of faucet or existing showerhead into a flexible and extendable shower apparatus.

Turning now to FIG. 1, there is shown a perspective view of one exemplary embodiment of the apparatus of the present invention for converting any type or size of faucet or existing showerhead into a flexible and extendable shower apparatus. The apparatus 10 includes an adaptable connector 12, a flexible and extendable hose 14, a shower head 16, and a clamp member 18. Adaptable connector 12 comprises a hollow flexible bulb shaped member 20 having a flexible lip 22 for receiving a faucet or existing shower head. Adaptable connector 12 is preferably comprised of a flexible, durable material such as a flexible rubber, polyethylene, or any other flexible polymers comprising lightweight thermoplastics that are resistant to chemicals and moisture and have good insulating properties.

Flexible and extendable hose 14 has a first end 24 and a second end 26. First end 24 is connected to an open end of said hollow flexible bulb shaped member 20 located opposite flexible lip 22 while second end 26 is connected to an open end of shower head 16. Like adaptable connector 12, flexible and extendable hose 14 is preferably comprised of a flexible rubber, polyethylene, or any other flexible polymers comprising lightweight thermoplastics that are resistant to chemicals and moisture and have good insulating properties. Hose 14 may also include multiple creases so that hose 14 can be compressed into a compact area if needed. Further, adaptable connector 12 and hose member 14 may comprise a single continuous piece.

In order to avoid the twisting and tangling of extendable hose 14, extendable hose 14 may rotate about a circumference of the second end 26 of extendable hose 14 at its connection point with shower head 16 in the direction referenced by arrow X by utilizing hardware currently known in the art. Moreover, if hollow, flexible bulb shaped member 20 and extendable hose 14 do not form one continuous piece but are instead connected to one another, extendable hose 14 may also be configured to rotate about a circumference of hollow, flexible bulb shaped member 20 at its connection point with hollow, flexible bulb shaped member 20 in the direction referenced by arrow Y.

Shower head 16 includes a handle 28, which may comprise a gripping means 30, and a switching means for releasing the flow of water into and through shower head 16 such as lever 32. Switching means is meant to include any mechanical means for containing the water within, and releasing the water from, the extendable hose and/or shower head. For example, such switching means may include a lever, a dial, an actuator device, a handle, or a button. Shower head 16 may also include a dial 34 which allows a user to change the pressure and configuration of water spray being released from the shower head.

Clamp 18 is configured such that it can fit around an exterior circumference of adaptable connector 12 located near the end of adaptable connector 12 that receives a faucet or existing shower head. Alternatively, clamp 18 may be formed within the adaptable connector 12 as to form an integral part of adaptable connector 12. Clamp 18 can then be cinched together decreasing its circumference so that adaptable connector 12 is securely fastened about an existing faucet or shower head. Alternative means for releasably securing the adaptable connector 12 to an existing faucet or shower head include a clip, a clasp, a grip, a vise, a fastener, a flexible band, or any other mechanical means that would result in a non-leak seal between the faucet and adaptable connector 12.

In addition, one or more suction cups 36 may be either removably or permanently attached to the shower head 16 or the flexible and extendable hose 14 so that the apparatus can be secured to other surfaces, preferably vertical surfaces, for easy storage and use. Further, a holder 38 may be either permanently or releasably connected to the hose 14 or adaptable connector 12 for holding the shower head 16.

Figure 2:
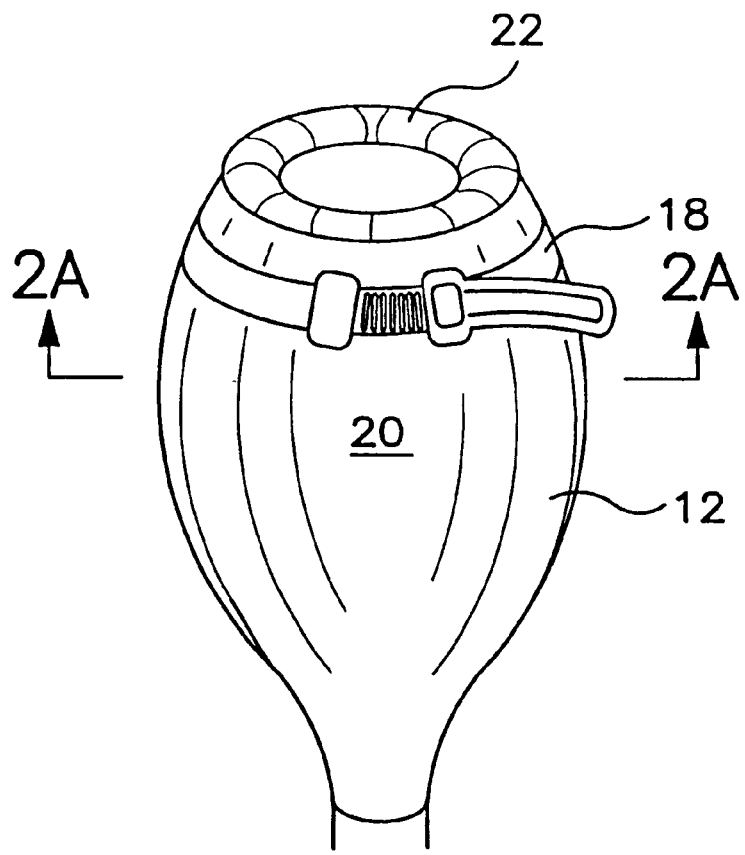
FIG. 2 is a perspective view of one exemplary embodiment of the adaptable connector included in the apparatus of the present invention for converting any type or size of faucet or existing showerhead into a flexible and extendable shower apparatus which comprises a hollow, flexible connector element having a generally bulb shaped configuration.
Figure 2A:
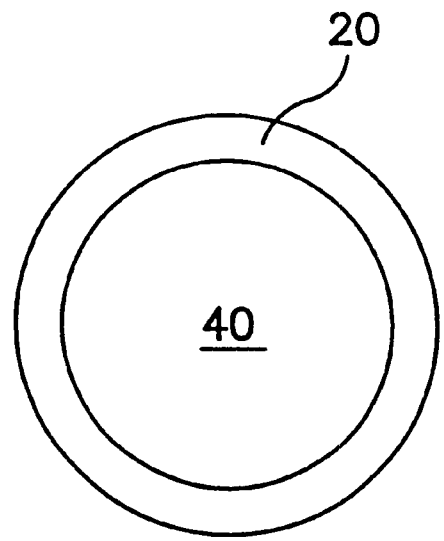
FIG. 2a is a cross-sectional view taken along line 2a—2a of FIG. 2.
Figure 5A:
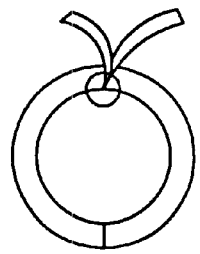
FIG. 5A is a side elevational view of a clip which can be used to secure the flexible opening of the adaptable connector of the present invention to an existing showerhead.
Figure 5B:
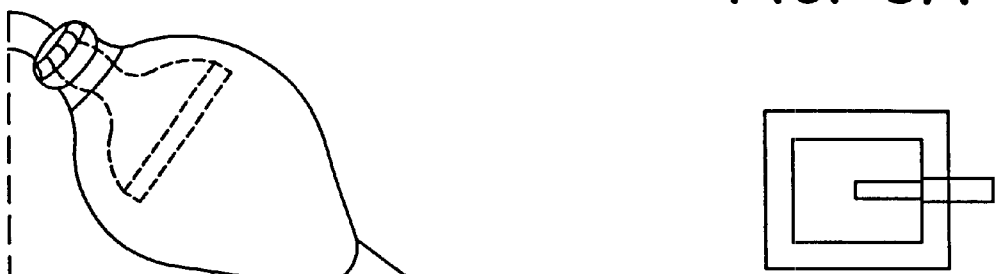
FIG. 5B is a side elevational view of a vise which can be used to secure the flexible opening of the adaptable connector of the present invention to an existing showerhead.
Figure 5:
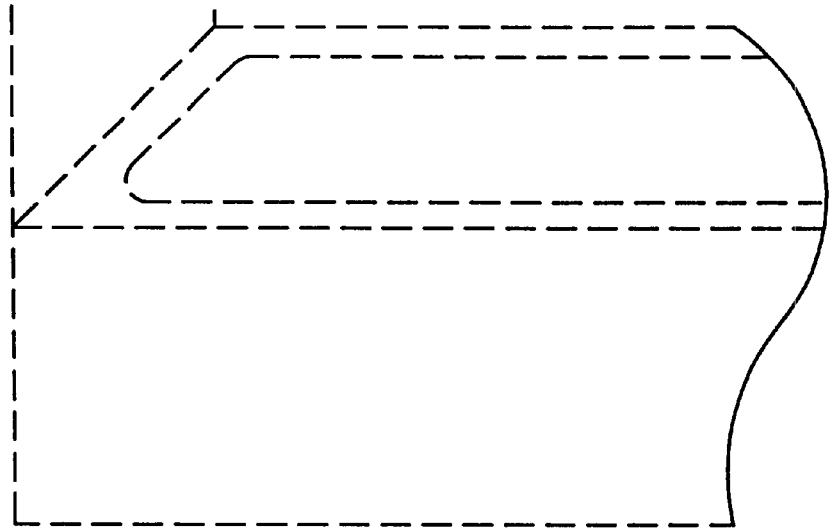
FIG. 5 is a partial side elevational view of an exemplary embodiment of the apparatus of the present invention shown attached to an existing showerhead with a flexible band.
Figure 6A:
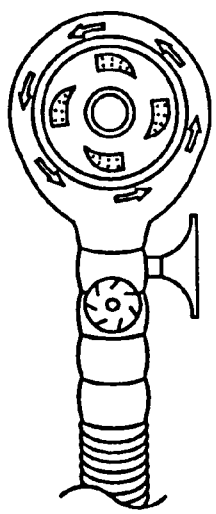
FIG. 6A is a partial bottom elevational view of an exemplary embodiment of the present invention having a dial mechanism for a switching means.
Figure 6B:
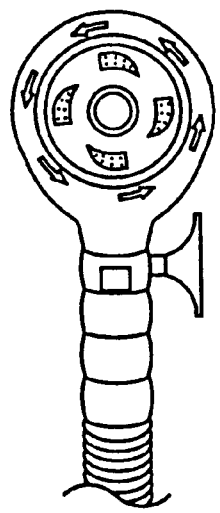
FIG. 6B is a partial bottom elevational view of an exemplary embodiment of the present invention having a button for a switching means.
Figure 6C:
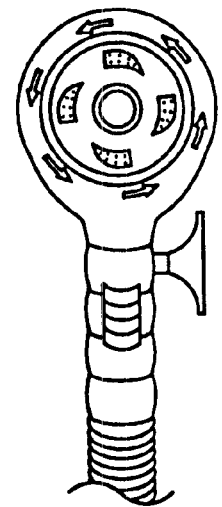
FIG. 6C is a partial bottom elevational view of an exemplary embodiment of the present invention having a handle for a switching means.

FIGS. 2 and 2a show one exemplary embodiment of the adaptable connector 12 included in the apparatus of the present invention for converting any type or size of faucet or existing showerhead into a flexible and extendable shower apparatus which comprises a flexible bulb shaped member 20. Flexible bulb shaped member 20 includes lip member 22 for receiving an existing faucet or shower head. Clamp 18 is positioned about a circumference of bulb member 20 near lip member 22 for releasably securing the bulb shaped member 20 to the faucet or existing shower head. FIG. 2a is a cross section of bulb shaped member 20 showing a hollow interior 40 through which the water passes after it exits the faucet or existing shower head.

Another exemplary embodiment of the adaptable connector included in the apparatus of the present invention for converting any type or size of faucet or existing showerhead into a flexible and extendable shower apparatus is shown in FIGS. 3 and 3a. FIG. 3a illustrates an adaptable connector 12 that comprises a curved tubular shaped member 46 having a first open end 48 and a second open end 50. First end 48 is releasably secured about a faucet or existing shower head with a securing means such as clamp 18, previously described, and second end 50 is connected to the first end 24 of hose 14. As previously stated, adaptable connector 12 and hose 14 may be formed from one continuous piece of material. Both adaptable connector 12 and extendable hose 14 are preferably comprised of a flexible rubber or plastic such as polyethylene or any other flexible polymers comprising lightweight thermoplastics that are resistant to chemicals and moisture and have good insulating properties. FIG. 3a illustrates a cross section of curved tubular shaped member 46 showing that curved tubular shaped member 46 has a hollow interior 60 through which water passes after leaving the faucet or existing shower head.

FIG. 4 shows a perspective view of the exemplary embodiment of the apparatus of the present invention for converting any type or size of faucet or existing showerhead into a flexible and extendable shower apparatus illustrated in FIG. 1 shown connected to a bathtub faucet. Clamp 18 is securely tightened around extendable connector 12 so that extendable connector 12 is securely attached to faucet 65. The flexible bulb shaped member 20 which comprises the adaptable connector 12 functions to accommodate high water pressure released from the faucet 65. The bulb shaped member 20 expands thereby increasing the interior space of the bulb shaped member so that water released from the faucet is not trapped at the first end 24 of hose 14 such that it backs up into adaptable connector 12 thereby creating a pressure that forces the adaptable connector 12 off of the faucet 65 despite clamp 18.

The apparatus of the present invention allows for easy installation and removal of adaptable connector 12 over an existing faucet or showerhead. In addition, the apparatus of the present invention comprises a minimum of necessary parts for adaptability to any type or size of existing faucet or shower head. It should be noted that the particular implementations shown and described herein are illustrative of the invention and its best mode and are not intended to otherwise limit the scope of the present invention in any way.

The present invention has been described above with reference to a preferred embodiment. However, those skilled in the art having read this disclosure will recognize that changes and modifications may be made to the exemplary embodiments without departing from the scope of the present invention. These and other changes and modifications are intended to be included within the scope of the present invention, as expressed in the following claims.

What is claimed is:

1. An apparatus for converting an existing showerhead to a flexible and extendable shower apparatus comprising:

an adaptable connector having a flexible opening for receiving an existing showerhead wherein said adaptable connector comprises a hollow, flexible bulb shaped member;

a new showerhead;

an extendable hose having first and second ends wherein said first end is connected to said adaptable connector and said second end is connected to said new showerhead; and means for releasably securing said flexible opening of said adaptable connector about an opening of said existing showerhead.

2. The apparatus of claim 1 wherein said shower head includes a handle.

3. The apparatus of claim 2 wherein the handle of said shower head rotates about a circumference of the second end of said extendable hose.

4. The apparatus of claim 1 wherein said adaptable connector and said extendable hose are formed from a continuous piece.

5. The apparatus of claim 1 wherein said shower head includes switching means for releasing water from said shower head.

6. The apparatus of claim 1 wherein said first end of said extendable hose rotates about a circumference of said adaptable connector at a connection point with the first end of said extendable hose.

7. The apparatus of claim 1 wherein said shower head rotates about a circumference of the second end of said extendable hose at a connection point with the second end of said extendable hose.

8. The apparatus of claim 1 wherein said means for releasably securing said flexible opening of said adaptable connector is selected from the group consisting of a clamp, a clip, a vise, and a flexible band.

9. The apparatus of claim 2 further comprising gripping means located on said handle.

10. The apparatus of claim 1 further comprising at least one suction cup attached to at least one of said extendable hose and said shower head for releasably securing at least one of said extendable hose and said shower head to a vertical surface.

11. The apparatus of claim 1 further comprising a holder attached to the first end of said extendable hose for holding said shower head.

12. The apparatus of claim 1 wherein said adaptable connector comprises a flexible polymer.

13. The apparatus of claim 1 wherein said extendable hose is comprised of a flexible polymer.

14. The apparatus of claim 1 wherein said switching means is selected from the group consisting of a lever, a dial mechanism, a handle, and a button.

15. A method for converting an existing showerhead into an extendable and flexible shower apparatus comprising the steps of:
   attaching an adaptable connector having a flexible opening about an opening of the existing showerhead;
   releasably securing said adaptable connector to said existing showerhead with a securing means; and
   employing a switching means on a new showerhead connected to said adaptable connector by way of an extendable hose to access a flow of water through said new showerhead.

16. The method of claim 15 wherein the step of attaching an adaptable connector having a flexible opening comprises the step of attaching a flexible open end of a hollow, flexible bulb shaped member about an opening of a faucet.

17. The apparatus of claim 12 wherein said flexible polymer comprises a lightweight thermoplastic is resistant to chemicals and moisture and has good insulating properties.

18. The apparatus of claim 13 wherein said flexible polymer comprises a lightweight thermoplastic that is resistant to chemicals and moisture and has good insulating properties.

* * * * *